United States Patent
MacDonald et al.

(10) Patent No.: US 9,068,358 B2
(45) Date of Patent: Jun. 30, 2015

(54) WALL PANEL SYSTEMS FOR RIGID WALL PANELS

(75) Inventors: Phil A. MacDonald, London (CA); Marco Santos, London (CA); Robert B. MacDonald, London (CA)

(73) Assignee: Exterior Wall Systems Limited, London, ON (CA)

( * ) Notice: Subject to any disclaimer, the term of this patent is extended or adjusted under 35 U.S.C. 154(b) by 495 days.

(21) Appl. No.: 13/437,992

(22) Filed: Apr. 3, 2012

(65) Prior Publication Data

US 2012/0186170 A1     Jul. 26, 2012

Related U.S. Application Data (63) Continuation-in-part of application No. 13/023,086, filed on Feb. 8, 2011, now Pat. No. 8,745,941, which is a continuation-in-part of application No. 12/507,639, filed on Jul. 22, 2009, now abandoned, which is a continuation-in-part of application No. 11/273,303, filed on Nov. 14, 2005, now abandoned.

(51) Int. Cl.
  *E04F 13/08* (2006.01)
  *E04F 13/14* (2006.01)
  *F24J 2/52* (2006.01)

(52) U.S. Cl.
  CPC ........... *E04F 13/083* (2013.01); *E04F 13/0805* (2013.01); *E04F 13/142* (2013.01); *F24J 2/5245* (2013.01); *Y02B 10/20* (2013.01); *Y02E 10/47* (2013.01)

(58) Field of Classification Search
  CPC ............... E04B 2/00; E04B 2/02; E04B 2/28; E04B 2/30; E04B 2/42; E04B 2/88; E04B 2/885; E04B 2/96; E04B 2/962; E04B 2/965; E04B 2/967; E04B 13/083; E04B 13/0805; E04B 13/142

USPC .............................. 52/508, 235, 511, 506.01, 52/506.05–506.1, 716.1, 718.01, 717.05, 52/384, 385
  See application file for complete search history.

(56) References Cited

U.S. PATENT DOCUMENTS 2,007,842 A     7/1935  Whiteside
3,982,370 A *  9/1976  Buffington .................... 52/481.2
(Continued)

OTHER PUBLICATIONS

International Preliminary Report on Patentability dated May 14, 2008 (1 page).

(Continued)

*Primary Examiner* — Elizabeth A Plummer
*Assistant Examiner* — Kyle Walraed-Sullivan
(74) *Attorney, Agent, or Firm* — Peter L. Brewer; Baker Donelson (57) ABSTRACT

Wall panel systems are provided. The systems use interlocking brackets to attach photovoltaic (PV), ceramic, or other rigid wall panels to an exterior wall of a building. The interlocking components include a plurality of wall mounting brackets configured to carry the dead loads of the respective wall panels, and a plurality of panel brackets that may be quickly hung from the wall mounting brackets. The wall mounting brackets are configured to be operatively fastened to an exterior wall surface, while each of the panel brackets is adhesively attached to the rear surface of a respective panel. Each of the wall mounting brackets and the nested panel brackets is substantially similar in dimension and configuration. Further, the system is configured to allow wall panels to be attached to the bracket assemblies in any sequence. A method for attaching architectural wall panels is also provided herein.

24 Claims, 8 Drawing Sheets

(56) References Cited

U.S. PATENT DOCUMENTS

| | | | |
|---|---|---|---|
| 4,070,835 A | | 1/1978 | Reverend et al. |
| 4,261,153 A | * | 4/1981 | Haines et al. ............. 52/506.09 |
| 4,344,267 A | | 8/1982 | Sukolics |
| 4,439,960 A | | 4/1984 | Jenkins |
| 4,845,909 A | * | 7/1989 | Bailey ............................ 52/235 |
| 4,999,960 A | * | 3/1991 | Herwegh et al. ............... 52/235 |
| 5,067,293 A | | 11/1991 | Reynolds |
| 5,083,405 A | * | 1/1992 | Miller ............................ 52/235 |
| 5,170,602 A | | 12/1992 | Ribic |
| 5,184,440 A | * | 2/1993 | Felix et al. ...................... 52/235 |
| 5,220,759 A | | 6/1993 | Hossli |
| 5,226,274 A | | 7/1993 | Sommerstein |
| 5,239,798 A | | 8/1993 | Saito |
| 5,263,292 A | | 11/1993 | Holland et al. |
| 5,285,602 A | * | 2/1994 | Felton ........................... 52/36.6 |
| 5,301,484 A | * | 4/1994 | Jansson .......................... 52/235 |
| 5,379,561 A | * | 1/1995 | Saito ............................. 52/235 |
| 5,522,193 A | | 6/1996 | Sommerstein |
| 5,544,461 A | | 8/1996 | Sommerstein |
| 5,678,383 A | * | 10/1997 | Danielewicz .................. 52/775 |
| 5,809,729 A | | 9/1998 | Mitchell |
| 5,893,245 A | | 4/1999 | Sekiguchi et al. |
| 6,035,598 A | * | 3/2000 | Sukolics et al. .......... 52/506.08 |
| 6,065,259 A | | 5/2000 | Clear |
| 6,098,364 A | | 8/2000 | Liu |
| 6,138,419 A | | 10/2000 | Sekiguchi et al. |
| 6,427,408 B1 | | 8/2002 | Krieger |
| 6,484,465 B2 | | 11/2002 | Higgins |
| 6,745,527 B1 | | 6/2004 | Sherman et al. |
| 6,748,709 B1 | | 6/2004 | Sherman et al. |
| 7,096,629 B1 | | 8/2006 | Cox |
| 7,134,247 B2 | * | 11/2006 | Ting ............................. 52/235 |
| 7,562,504 B2 | * | 7/2009 | Herbst et al. .................... 52/461 |
| 7,562,509 B2 | * | 7/2009 | Ness ......................... 52/800.11 |
| D619,880 S | | 7/2010 | MacDonald et al. |
| 7,752,818 B1 | | 7/2010 | Roegge |
| 8,166,716 B2 | * | 5/2012 | MacDonald et al. ........... 52/235 |
| 8,240,099 B2 | * | 8/2012 | Hummel, III .............. 52/506.05 |
| 2002/0124514 A1 | * | 9/2002 | Higgins ..................... 52/506.06 |
| 2003/0110726 A1 | * | 6/2003 | Rudduck ........................ 52/474 |
| 2005/0060950 A1 | | 3/2005 | Hauschildt et al. |
| 2006/0179744 A1 | | 8/2006 | Lynch et al. |
| 2007/0119105 A1 | | 5/2007 | MacDonald et al. |
| 2008/0236086 A1 | * | 10/2008 | Huang ............................ 52/508 |
| 2009/0241444 A1 | | 10/2009 | Griffiths |
| 2009/0241451 A1 | * | 10/2009 | Griffiths ....................... 52/309.4 |
| 2010/0071279 A1 | * | 3/2010 | Brescia ........................ 52/173.3 |
| 2010/0186343 A1 | | 7/2010 | MacDonald et al. |
| 2010/0263314 A1 | * | 10/2010 | MacDonald et al. ...... 52/506.05 |

OTHER PUBLICATIONS

Written Opinion of the International Searching Authority dated Jan. 2, 2007 (5 pages).

Brochure for Fischer Fixing Systems describing a curtain wall technique using a Fischer Zykon-Panet Anchor FZP-N, downloaded from http://www.fischerco.uk/PortalData/18/Resources/fixing_systems/act/FZP_anchors/Brochure_FZP_-_N.pdf on Mar. 29, 2011 (6 pages.

Stonepanels, Inc. technical drawings, Feb. 3, 2009 (2 pages).

Almag Aluminum, Inc., technical drawing, Feb. 23, 2010 (1 page).

Allface Smart Fixing Systems, Smart Fixing Systems brochure, downloaded from Internet website on Mar. 29, 2014 (4 pages).

Ashtech™ Rainscreen Cladding Systems Brochure, Apr. 2005 (retrieved on Aug. 10, 2009) www.ashlandlacy.com/ashtech/index.aspx (16 pages).

CGL Rainscreen System (date unknown) (retrieved on Aug. 10, 2009) www.cglsystems.co.uk/products/metal-facade-systems.htm (1 page).

Northclad Rainscreen Solutions ACM Series Details (Copyright 2010) (retrieved on-line on Sep. 28, 2010 from http://northclad.com/products/acm/details/) (5 pages).

Keith Panel Systems, System Details, self-published technical brochure available at: http://www.keithpanel.com/files/KPSS-SystemA_4mm.pdf. (Copyright 2008) (19 pages).

Doralco: Architectural Metal Solutions, Product Details Downloads, Composite Wall Panels Details, 07 42 43 Rainscreen Details, self-published technical brochure available at http://www.doralco.com/imgs/07_42_43_Rainscreen_Composite_Panel_%20Details.pdf (Copyright 2009) (38 pages).

Sobotec Ltd: Architectural Wall Systems, Products, SL-2000 Dry Joint Filler System, self-published technical brochure available at: http://www.sobotec.com/SL2000.htm (Apr. 2004) (1 page).

Office Action dated Jan. 14, 2010 in related U.S. Appl. No. 11/273,303.

Petersen Aluminum Corporation technical drawings (2008-2009) (retrieved on-line on Sep. 28, 2010 from http://www.pac-clad.com/products/wall-soffit-systems/composite-wall-panels/) (2 pages).

Northclad Rainscreen Solutions manual (Copyright 2009) (21 pages).

U.S. Appl. No. 29/392,519 filed May 23, 2011 (4 pages for the patent application and 7 sheets for the new drawing set).

Notice of Allowance and Notice of Allowability for U.S. Appl. No. 29/392,519 (5 sheets).

* cited by examiner

WALL PANEL SYSTEMS FOR RIGID WALL PANELS

STATEMENT OF RELATED APPLICATIONS

This application is filed as a continuation-in-part patent application of U.S. patent application Ser. No. 13/023,086, which was filed on 8 Feb. 2011. That application is entitled "Methods for Installing Wall Panels to the Exterior Wall of a Building," and issued as U.S. Pat. No. 8,745,941 on Jun. 10, 2014.

CIP U.S. Pat. No. 8,745,941 was filed as a continuation-in-part of U.S. patent application Ser. No. 12/507,639 which was filed on 22 Jul. 2009. That application is also entitled "Methods for Installing Wall Panels to the Exterior Wall of a Building." That application has been published as U.S. Patent Publ. No. 2010/0186343, and is abandoned.

The application Ser. No. 12/507,639 filed in 2009 claims the benefit of U.S. patent application Ser. No. 11/273,303 which was filed on 14 Nov. 2005 (now abandoned). That application was entitled "Dry Joint Aluminum Wall Panel Attachment System," and published as U.S. Patent Publ. No. 2007/0119105.

These prior applications are incorporated herein in their entirety by reference.

STATEMENT REGARDING FEDERALLY SPONSORED RESEARCH OR DEVELOPMENT

Not applicable.

THE NAMES OF PARTIES TO A JOINT RESEARCH AGREEMENT

Not applicable.

BACKGROUND OF THE INVENTION

This section is intended to introduce various aspects of the art, which may be associated with exemplary embodiments of the present disclosure. This discussion is believed to assist in providing a framework to facilitate a better understanding of particular aspects of the present disclosure. The Background section should be read in this light, and not necessarily as admissions of prior art.

FIELD OF THE INVENTION

The present disclosure relates to attachment systems for architectural panels, such as porcelain ceramic tile (PCT) panels. The present disclosure also pertains to methods of attaching rigid wall panels to exterior wall surfaces.

DISCUSSION OF TECHNOLOGY

Attachment systems for exterior walls of buildings are known. These attachment systems are used for attaching aluminum or aluminum composite wall panels along an exterior building surface.

An example of a known attachment system is presented in U.S. Pat. No. 5,226,274, entitled "Panel Mounting Clip." The '274 patent discloses a first "clipping member" that is secured to a panel adjacent an edge of the panel. The '274 patent also discloses a second "clipping member" that is pre-attached to the building structure itself. The second clipping member has a channel (shown in the patent at 26) that snugly receives a male member (shown at 20) of the first clipping member. In this way, the panel may be connected to the building structure.

The attachment system of the '274 patent relies upon the placement of mounting clips around all peripheral edges of the composite panels. "The first clipping member 10 is secured to each edge of a panel 12." This may be done either by connecting the first clipping member to the panel using a screw (seen at 18 in FIG. 1) or by sliding the panel edges into panel engaging channels (seen at 34 in FIG. 2). "Then, a plurality of second clipping members 24 are secured to a sub-girt 38 of a building in a position to secure the lower edge, for example, of the panel 12." (col. 4, 1. 8-5).

U.S. Pat. No. 4,070,835 describes another mounting system. The system of the '835 patent employs a plurality of individual components for hanging panels onto a building structure. The components include an elongated "sole plate 30" that attaches to the back of each panel by means of two or more connecting screws 38. The sole plate 30 hangs on to so-called "profile members 13," which in turn are connected to a bracket 24 by means of a "hooking groove 15." The sole plate 30 and the bracket 24 include slots that allow the position of the panel "P" relative to the wall to be selectively adjusted.

U.S. Pat. No. 7,854,099 provides yet another panel mounting system, wherein architectural panels are supported by a combination of a frame (referred to as sides 101, 103) and stiffeners 117. The mounting system is used for hanging panels having flanged edges, that is, aluminum composite panels. The stiffeners connect to the frame using screws 111, clips 155, and plates 159, 161. The stiffeners connect to the panels using a silicone adhesive. The panels of the '099 patent are designed to be particularly rugged so as to withstand hurricane-force winds.

Other attachment systems of interest are described in U.S. Pat. Nos. 5,239,798; 5,379,561; 5,522,193; 5,544,461; 6,035,598; and 7,562,509.

An improved panel attachment system is needed that allows wall panels to be hung quickly and efficiently, and in any sequence or direction. Further, an improved wall panel system is needed that allows stiff panels such as porcelain or other ceramic tiles to be hung vertically on a wall.

SUMMARY OF THE INVENTION

Wall panel systems for attaching architectural panels to an exterior building wall are provided herein. The systems allow for the attachment of two or more adjacent panels to an exterior building wall. The panels are rigid wall panels such as ceramic tiles, photovoltaic cell panels, or other rigid wall panels. The wall panels are hung using inter-engaging wall mounting brackets and panel brackets. The wall mounting brackets are connected to the exterior wall, such as through a mechanical fastener, while the panel brackets are connected to a rear surface of respective wall panels using an adhesive. The adhesive may be, for example, one or more strips of bonding tape or structural silicone adhesive.

The brackets utilize an inter-locking connection that enables panels to be hung quickly and in any sequence or direction. Preferably, each of the wall mounting brackets and each of the panel brackets is substantially similar in dimension and configuration. Thus, the two parts are fully interchangeable.

Each of the plurality of wall mounting brackets is configured to carry the dead load of a respective wall panel. Each wall mounting bracket has:

an exterior surface configured to reside adjacent to the building wall, a central fastening surface along the exterior surface,
an upper channel above the central fastening surface extending opposite the exterior surface, and
a lower channel below the central fastening surface and also extending opposite the exterior surface.

Each of the plurality of panel brackets comprises:
an exterior surface configured to reside along a rear surface of a respective wall panel,
an adhesive along the exterior surface connecting the panel bracket to a respective panel,
an upper channel extending opposite the exterior surface and configured to nest on and within the upper channel of a respective wall mounting bracket, and
a lower channel also extending opposite the exterior surface and configured to nest on and over the lower channel of the respective wall mounting bracket.

Preferably, the attachment system also includes a plurality of bracket assemblies fastened to the exterior wall. Each bracket assembly may comprise, for example, two back-to-back L-angle brackets fastened to each other to form a generally Z-shaped assembly. A first end of the assembly is attached to the wall, while a second opposite end is fastened to a wall mounting bracket. Thus, the bracket assemblies form a sub-framing.

The central fastening surface of each wall mounting bracket is operatively connected to the wall by means of a mechanical fastener. Where sub-framing is used, the central fastening surface of each wall mounting bracket is connected to the second end of the bracket assembly.

A method for attaching architectural wall panels to an exterior building wall is also provided herein. The method uses a plurality of rigid wall panels, such as ceramic tiles.

The method includes attaching a plurality of wall mounting brackets to the exterior building wall. Each of the wall mounting brackets is configured as described above. The wall mounting brackets are spaced to accommodate the position of a corresponding wall panel.

The method also includes hanging a wall panel onto each of the wall mounting brackets. Each wall panel has an attached panel bracket, with the panel brackets being configured as described above. Each of the wall mounting brackets and the nested panel brackets is substantially similar, if not identical, in dimension and profile.

The system is configured to allow wall panels to be attached to the bracket assemblies in any sequence or direction.

Optionally, the method includes attaching a panel bracket to a respective wall panel by means of the adhesive. The adhesive is one or more strips of bonding tape, structural silicone adhesive, or combinations thereof. Once the panel brackets are secured to the backs of the panels, the panels may be quickly hung without need of further mechanical fastening.

BRIEF DESCRIPTION OF THE FIGURES

So that the manner in which the above recited features of the present invention can be better understood, certain drawings are appended hereto. It is to be noted, however, that the appended drawings illustrate only selected embodiments of the inventions and are therefore not to be considered limiting of scope, for the inventions may admit to other equally effective embodiments and applications.

DETAILED DESCRIPTION

Wall panel attachment systems are provided herein. The wall panel attachment systems employ extruded aluminum brackets for fastening a plurality of rigid panels to an exterior building surface. The brackets may be fabricated from a milled or anodized aluminum. The efficacy of the system is enhanced by the use of inter-changeable, inter-locking brackets that allow panels to be quickly hung onto an exterior wall.

The wall panel attachment system is designed for use with rigid architectural panels. These include, for example, solar or photovoltaic (PV) panels, and porcelain ceramic tile (PCT) panels.

Figure 1A:
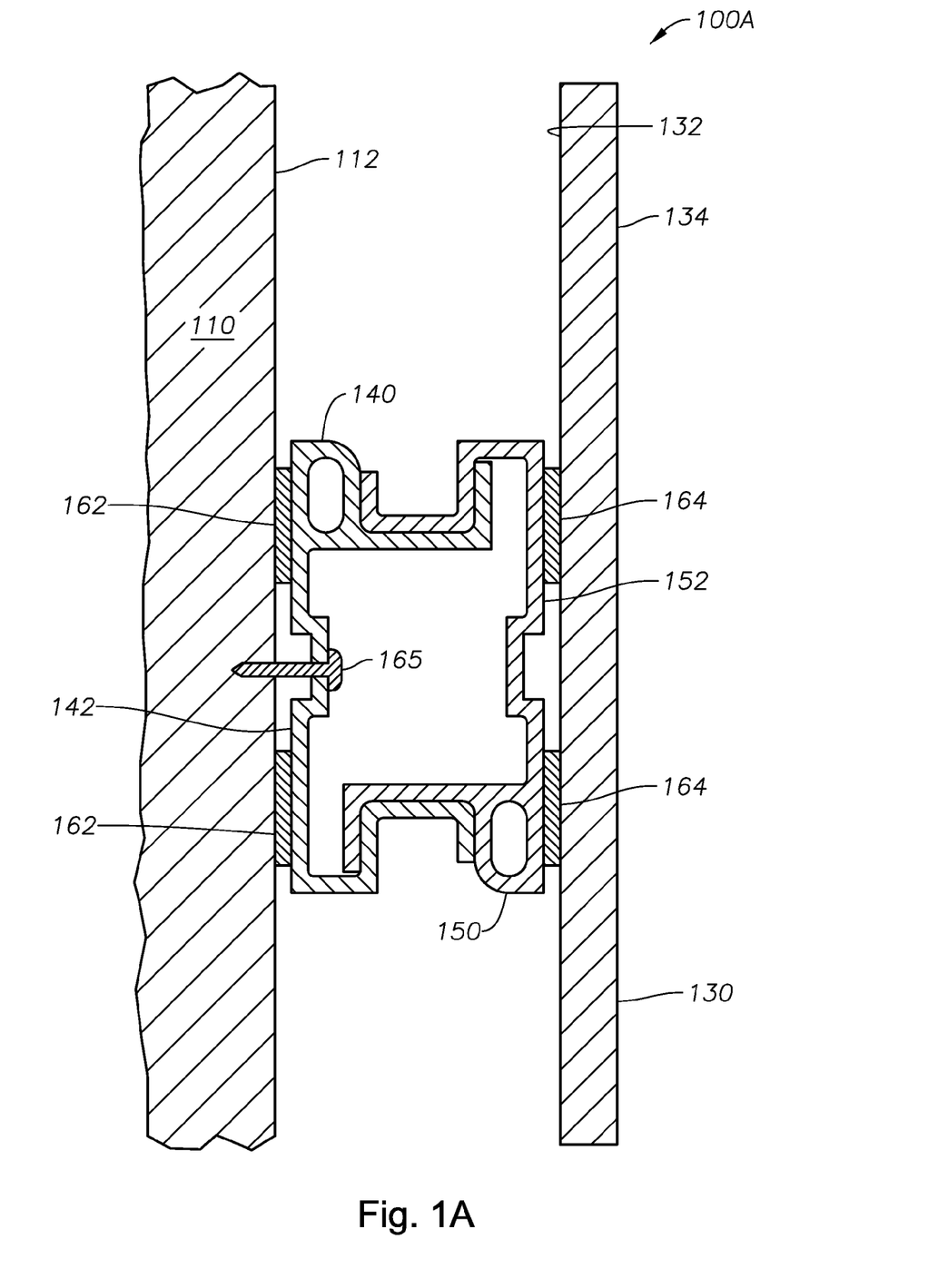
FIG. 1A is a side, cross-sectional view of a wall panel attachment system, in one embodiment. The wall panel is a rigid architectural panel. A single wall mounting bracket is shown secured immediately to an exterior wall for carrying the dead load of the panel.

FIG. 1A presents a side, cross-sectional view of a wall panel attachment system 100A, according to one embodiment. Here, a wall is shown at 110. The wall 110 has an exterior surface 112. The attachment system 100A is affixed directly to the exterior surface 112 of the wall 110.

Figure 7:
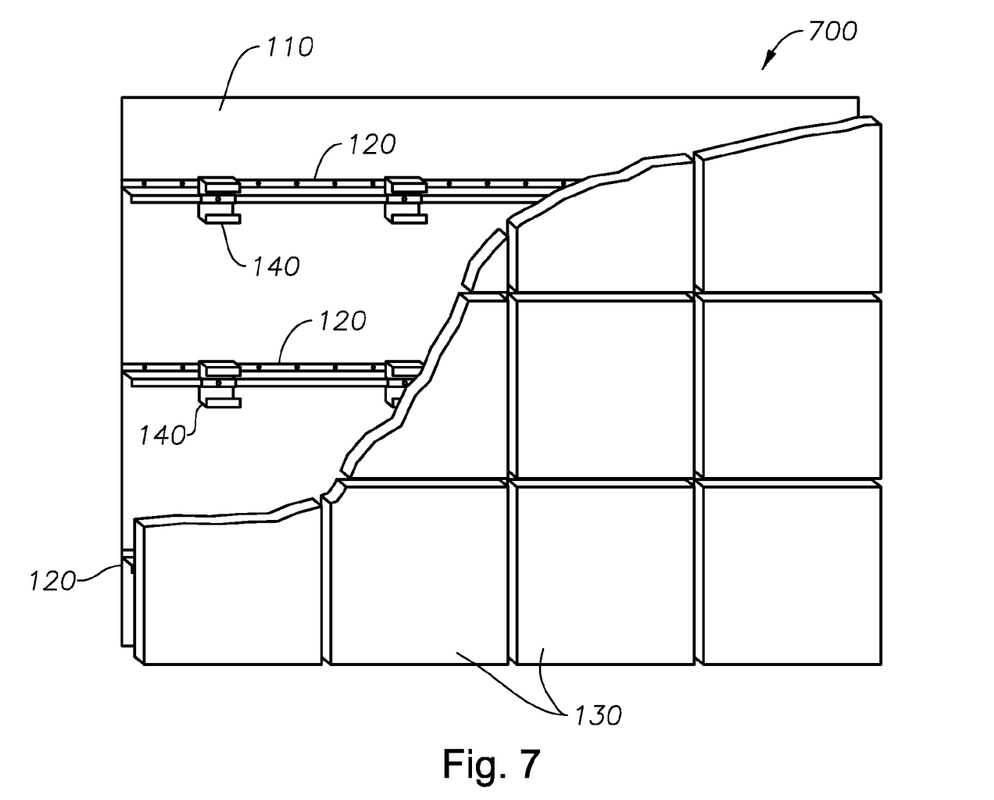
FIG. 7 is a perspective view of sub-framing used for mounting a plurality of rigid architectural panels in the present system, in one arrangement. Selected panels are peeled away to expose the sub-framing.

The attachment system 100A is used to attach rigid wall panels 130 to the exterior surface 112 of the wall 110. Here, a single panel 130 is shown. However, it is understood that the wall 110 will receive a plurality of panels 130 as architectural wall sections. The placement of a plurality of panels 130 is shown in FIG. 7, described below.

The illustrative panel 130 is fabricated from a ceramic material. Thus, the panel 130 is a ceramic tile. For purposes of the present disclosure, the terms "ceramic" or "ceramic material" may include oxides such as alumina and zirconia. Specific examples include bismuth strontium calcium copper oxide, silicon aluminium oxynitrides, uranium oxide, yttrium barium copper oxide, zinc oxide, and zirconium dioxide. "Ceramic" may also include non-oxides such as carbides, borides, nitrides and silicides. Specific examples include titanium carbide, silicon carbide, boron nitride, magnesium diboride, and silicon nitride. The term "ceramic" also includes composites, meaning particulate reinforced, combinations of oxides and non-oxides. Additional specific examples of ceramics include barium titanate, strontium titanate, ferrite, and lead zierconate titanate.

A preferred ceramic material is porcelain. Porcelain is a ceramic material made by heating raw materials, generally including clay in the form of kaolin, in a kiln to temperatures between 1,200° C. (2,192° F.) and 1,400° C. (2,552° F.). Porcelain may be fabricated as tiles, referred to as porcelain ceramic tile, or PCT. In some instances, PCT may also be referred to as a "cladding material" or a "veneer."

Each ceramic tile, or panel 130, may be, for example, 3.5 mm to 11.00 mm in thickness. Each panel 130 is preferably reinforced using a 0.5 mm to 1.0 mm laminate of fiberglass on one side. Alternatively, the laminate may be used as a core of the panel 130, with two ceramic sheets being placed on either side of the laminate. It is understood that the panels 130 are not limited to any particular composition or structure unless expressly stated in the claims, with the exception that the panels are substantially inflexible.

The attachment system 100A also includes a pair of brackets 140, 150. Bracket 140 is a wall mounting bracket, while bracket 150 is a panel bracket. It will be seen herein that the two brackets 140, 150 may actually be substantially similar or even identical in geometry and dimension.

In the side view of FIG. 1A, the two brackets 140, 150 are shown in a nesting position. This means that the panel bracket 150 is inter-engaged with the wall mounting bracket 140. In order to effectuate the nesting, each bracket 140, 150 has a pair of channels.

Figure 1B:
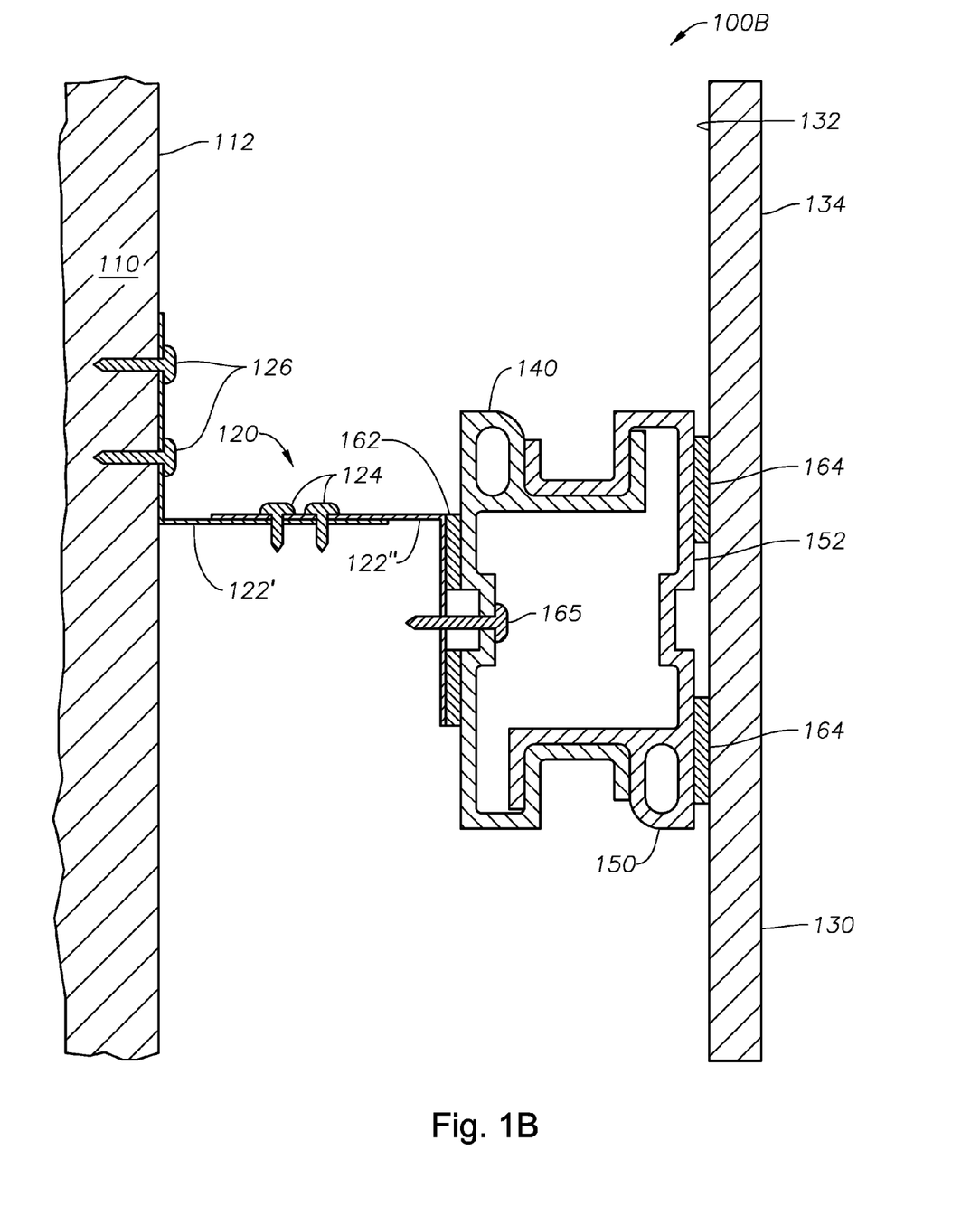
FIG. 1B is a side, cross-sectional view of a wall panel attachment system, in an alternative embodiment. The wall panel is again a rigid architectural panel. A wall mounting bracket is shown, but is secured to an exterior wall via a bracket assembly.
Figure 2:
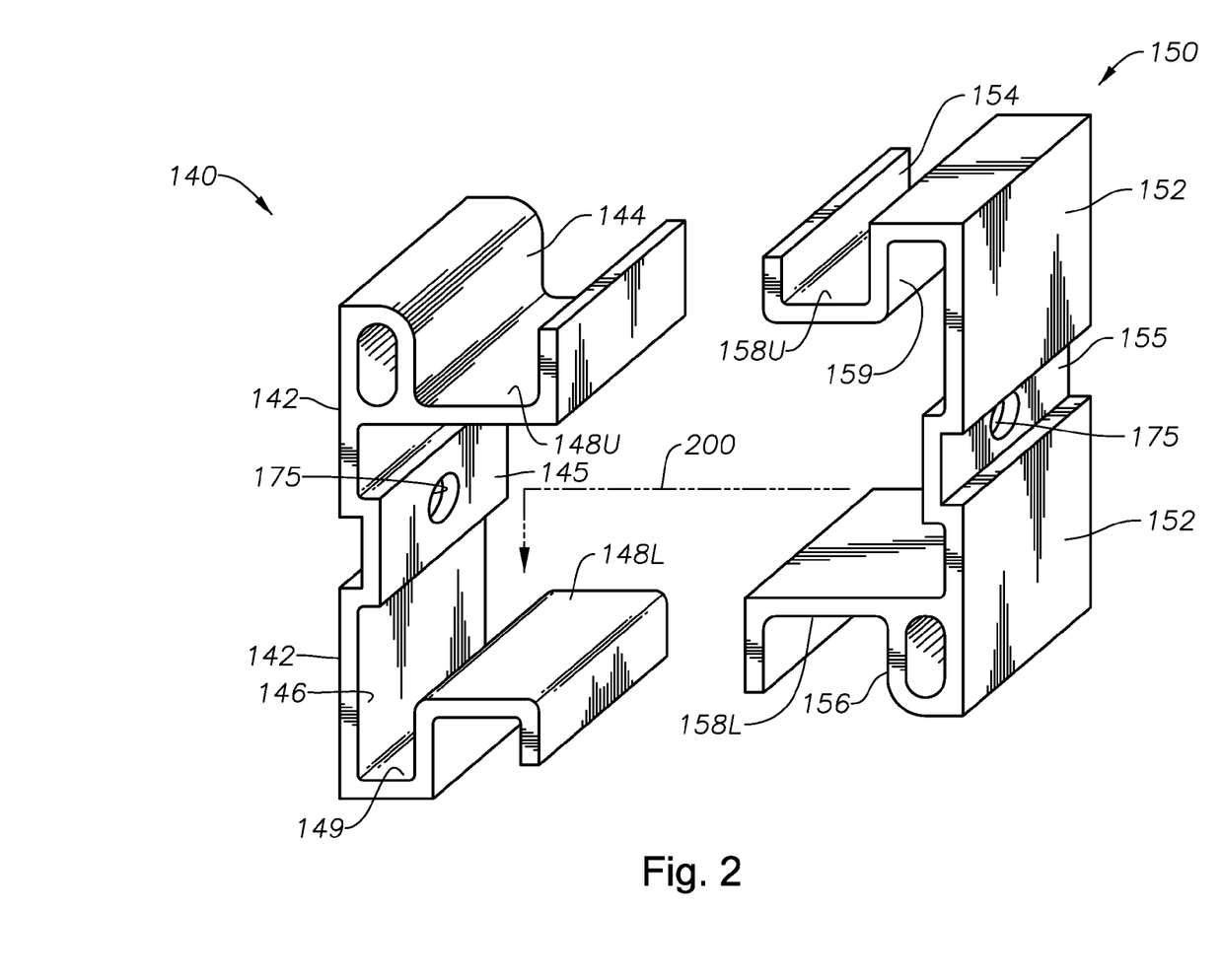
FIG. 2 is a first perspective view of the mounting brackets of the wall panel attachment system of FIG. 1, in one embodiment. The brackets are exploded away from each other for illustrative purposes. One bracket is a wall mounting bracket, while the other is a panel bracket.

Referring to FIG. 2, FIG. 2 is a first perspective view of the mounting brackets 140, 150 of the wall panel attachment system 100 of FIG. 1, in one embodiment. The brackets 140, 150 are exploded away from each other (un-nested) for illustrative purposes.

Figure 4:
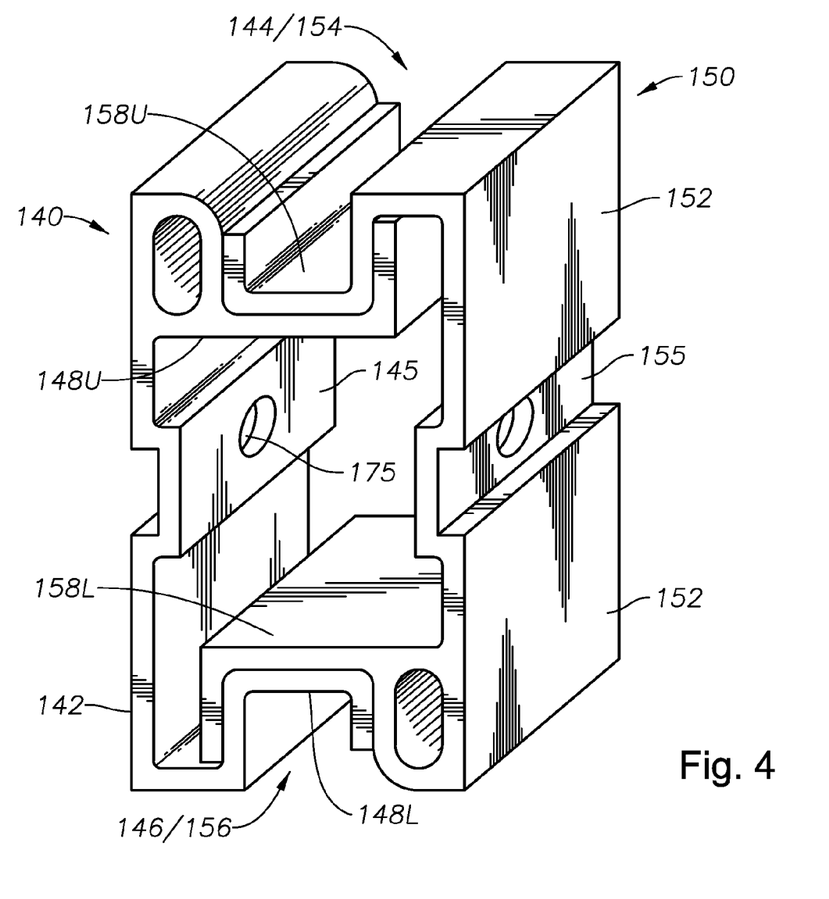
FIG. 4 is a second perspective view of the mounting brackets of the wall panel attachment system of FIG. 1. Here, the mounting brackets have been inter-engaged.

The wall mounting bracket 140 includes an exterior surface 142. The exterior surface 142 is preferably substantially planar, and is designed to abut the wall 110 (or the optional sub-framing bracket assemblies 120 as shown in FIG. 1B). Along the exterior surface 142 is a central fastening surface 145. The central fastening surface 145 is indicated in FIGS. 2 and 4, and preferably lies central to a longitudinal axis of the wall mounting bracket 140.

The fastening surface 145 includes at least one through-opening 175. The through-opening 175 is configured to receive a fastener. A fastener is not shown in FIG. 2, but is shown as a threaded screw 125 in FIG. 1A. It is understood that other threaded fasteners such as bolts may be used.

A foam tape 162 or gasket material is also shown in FIG. 1A. The tape 162 is preferably a closed-cell neoprene tape. The tape 162 is placed between the exterior wall surface 112 and the exterior surface 142 of the wall mounting bracket 140. The tape 162 acts as a cushion and a bond breaker to the adjoining materials representing the wall 110 and the wall mounting bracket 140.

The wall mounting bracket 140 has an upper portion 144 above the central fastening surface 145. The wall mounting bracket 140 also has a lower portion 146 below the central fastening surface 145. The upper portion 144 is characterized by an upper channel 148U, while the lower portion 146 is characterized by a lower channel 148L.

The channels 148U, 148L each define a generally C-shaped member extending away from the exterior surface 142. The upper channel 148U is itself a receiving member, while the lower channel 148L forms a separate receiving member, shown at 149.

The wall mounting bracket 140 is preferably about 2.5 to 12 inches (6.4 to 30.5 cm) in length, and about 1 to 6 inches (2.5 to 15.2 cm) in width. Further, the wall mounting bracket 140 may extend outward from the exterior surface 142 about 1 to 3 inches (2.54 to 7.6 cm), forming a depth.

The panel bracket 150 is essentially the same component as the wall mounting bracket 140. In this respect, the panel bracket 150 includes an exterior surface 152. The exterior surface 152 is preferably substantially planar, and is designed to abut a rear surface 152 of the panel 130. Along the exterior surface 152 is a central fastening surface 155. The fastening surface 145 preferably lies central to a longitudinal axis of the wall mounting bracket 140.

The central fastening surface 155 may optionally include a through-opening 175. The through-opening 175 is configured to receive a fastener (not shown). However, in the preferred embodiment a mechanical fastener is not used to attach the panel bracket 150 to the panel 130; rather, only an adhesive material is used. The adhesive material is placed between the exterior surface 152 and a rear surface 132 of the panel 130. An adhesive material is shown at 164 in FIG. 1A.

The adhesive material 164 may be small strips of structural bonding tape, such as the two-sided VBH bonding tape manufactured by 3M Company. The two-sided bonding tape 164 (or other adhesive material) is adhered to the exterior surface 152 of the panel bracket 150 and the rear surface 132 of the panel 130. To ensure a good bonding between the adhesive material 164 and the exterior surface 152 of the panel bracket 150, the exterior surface 152 should be wiped-down and cleaned utilizing an alcohol or other appropriate solution. Similarly, to ensure a good bonding between the adhesive material 164 and the panel 150, the exterior surface 132 of the panel 130 should be wiped-down and cleaned utilizing an alcohol or other appropriate solution. One such cleaning solution is a 70% by vol. IPA/water mixture.

In addition, the operator may choose to apply a primer to the exterior surface 152 of the panel bracket 150 and to the exterior surface 132 of the panel 130. The primer used for the aluminum extrusion components, that is, the wall mounting bracket 140, may be an AP111 treatment available from 3M Company of St. Paul, Minn. The primer used for the ceramic tile panels is preferably Primer 94, which is also available from 3M Company. The primers are wiped onto the surfaces before applying the tape.

As an alternative to the structural bonding tape, a viscous adhesive may be used as the adhesive material 164. The adhesive material 164 may be a structural silicone adhesive and sealant, such as the 983 Silicone Glazing and Curtainwall adhesive/sealant product manufactured by Dow Corning of Midland, Mich. The adhesive material 164 is applied to the exterior surface 152 of the panel bracket 150. In this manner, the panel bracket 150 is securely bonded to the panel 130 without need of a mechanical fastener or shoulder. Optionally, a small amount of structural silicone adhesive may be applied to the exterior surface 142 of the wall mounting bracket 140. In this way, wall mounting bracket 140 is more securely attached to the exterior wall surface 112.

As with the wall mounting bracket 140, the panel bracket 150 has an upper portion 154 above the central fastening surface 155, and a lower portion 156 below the central fastening surface 155. The upper portion 154 is characterized by an upper channel 158U, while the lower portion 156 is characterized by a lower channel 158L.

The channels 158U, 158L each define a generally C-shaped member extending away from the exterior surface 152. The upper channel 158U is received within the upper channel 148U and also forms a separate receiving member, shown at 159, while the lower channel 158L receives the lower channel 148L.

The panel bracket 150 preferably has the same dimensions as the wall mounting bracket 140, as listed above. Further, the panel bracket 150 is preferably identical in configuration or profile to the wall mounting bracket 140. This is readily seen by envisioning the panel bracket in FIG. 2 being turned 90° clockwise such that the upper channel 158U is at the bottom of the page, and the lower channel 158L is at the top of the page.

Figure 3A:
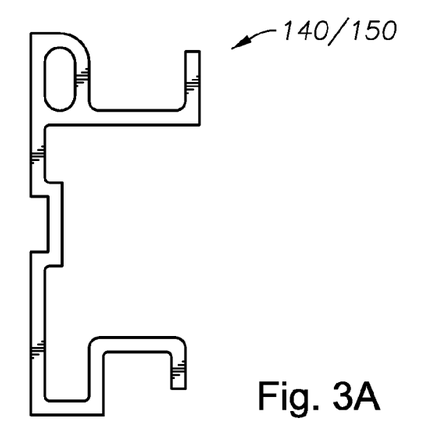
FIGS. 3A and 3B present left and right side views of the mounting brackets of FIG. 2. The wall mounting bracket and the panel bracket have the same configuration so that the left and right sides of each bracket are substantially identical.
Figure 3B:
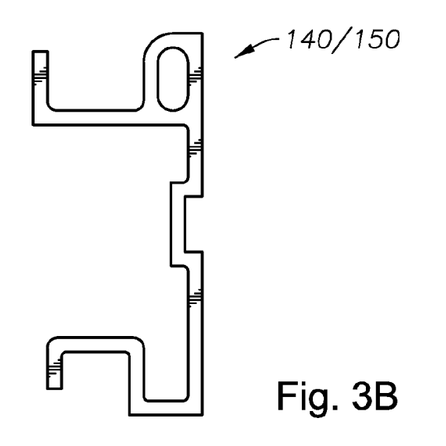

FIGS. 3A and 3B present left and right side views of the mounting brackets 140, 150 of FIG. 2. In this view, the wall mounting bracket 140 and the panel bracket 150 have the same configuration so that the left and right sides of each bracket 140, 150 is identical.

The wall mounting bracket 140 and the panel bracket 150 may be fabricated through an extrusion process. The extrusion process begins with an aluminum billet, which is the material from which the profiles are preferably extruded. The billet must be softened by heat prior to the extrusion process. The heated billet is placed into an extrusion press, which represents a powerful hydraulic device wherein a ram pushes a dummy block. The dummy block, in turn, forces the softened metal through a precision opening, known as a die. The die produces the required shapes.

The extruded parts are cut to specific lengths. The extruded parts may have a milled or an anodized finish. It is, of course, understood that the system 100 is not limited by the specific extrusion process or other method by which the component parts are manufactured.

Returning again to FIG. 2, arrow 200 is provided. The arrow 200 demonstrates how the two brackets 140, 150 may be readily nested. Particularly, the upper channel 158U of the panel bracket 150 rests upon and within the upper channel 148U of the wall mounting bracket 140, and the lower channel 158L of the panel bracket 150 rests upon and over the lower channel 148L of the wall mounting bracket 140.

FIG. 4 is a second perspective view of the mounting brackets 140, 150 of the wall panel attachment system of FIG. 1. Here, the mounting brackets 140, 150 have been inter-engaged. One novel aspect of the present system 100A is that while the two brackets 140, 150 are substantially identical in configuration, they are nevertheless able to nest together in such a way that a panel 130 may be quickly hung onto the wall 110 without need of a mechanical fastener connecting the two brackets 140, 150, in one embodiment. Further, the panels 130 may be hung in any sequence or direction since the mounting system is not interdependent with adjacent panels.

Figure 5:
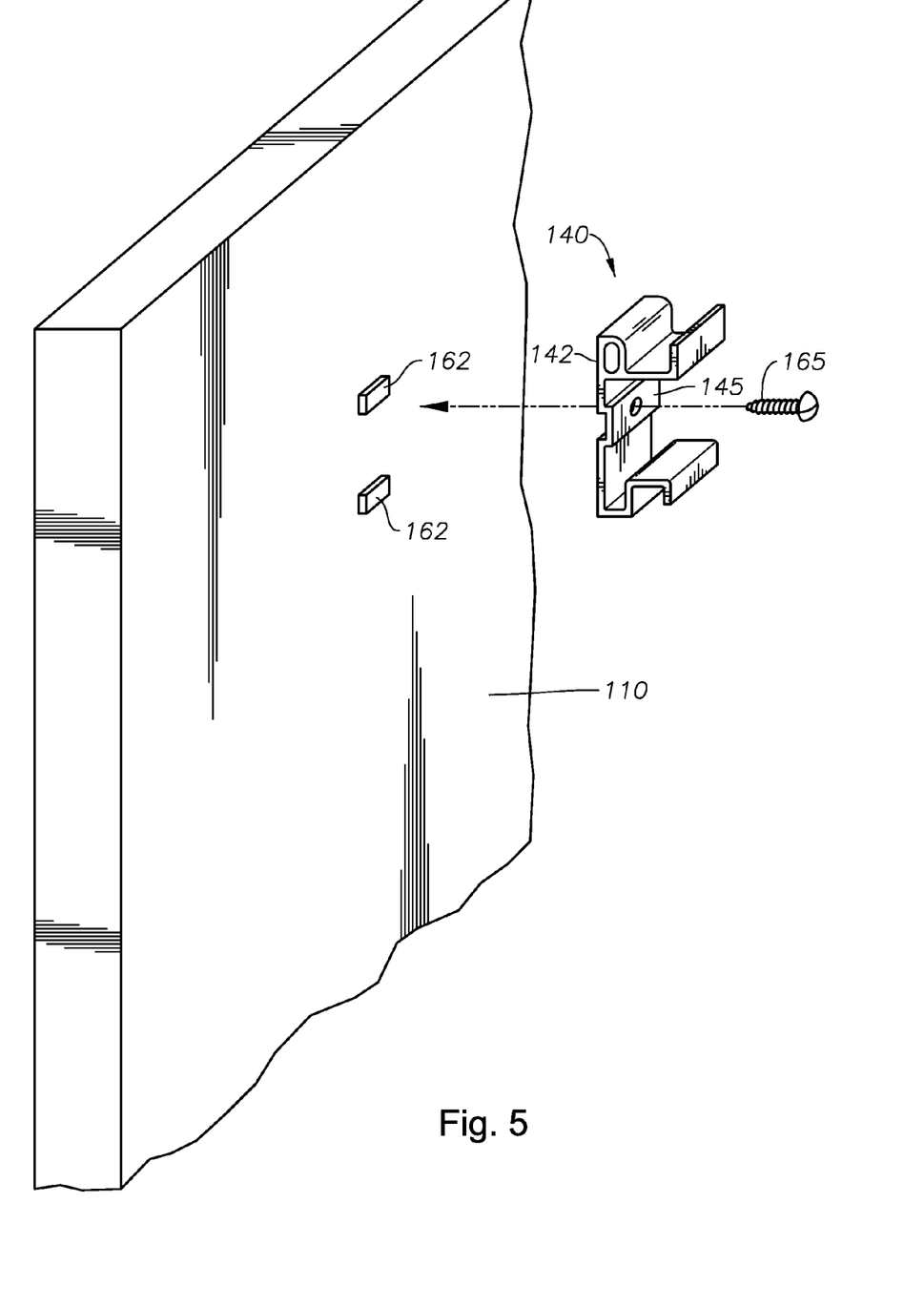
FIG. 5 is a perspective view of the wall mounting bracket of FIG. 2. The wall bracket is shown exploded away from an exterior wall. An attachment screw is shown exploded away from the wall mounting bracket.

To demonstrate the connection of the wall mounting bracket 140 to the wall 110, FIG. 5 is provided. FIG. 5 is a perspective view of the wall mounting bracket 140 of FIGS. 2 and 3. The wall bracket 140 is shown exploded away from an exterior building wall 110.

In FIG. 5, a threaded fastener 165 is shown exploded away from the bracket 140. The illustrative threaded fastener 165 is a screw. The attachment screw 165 is directed through the through-opening 175 in the central fastening surface 145. The screw 165 is further intended to be secured into the wall 110.

To provide additional strength for the attachment, an adhesive material may be applied to either the wall 110 or to the exterior surface 142 of the wall mounting bracket 140. This may be done in lieu of the screw 165 or in conjunction with the screw 165 when attaching the wall mounting bracket 140 to the wall 110. The adhesive material may be, for example, a two-sided tape bonding tape that adheres to the wall 110 on one side, and to the exterior surface 142 of the wall mounting bracket 140 on the other side.

In operation, the installation company may run the screw 165 into the wall 110 with or without adhesive, and then hang a panel 130. If it appears that the location, orientation or spacing of the wall mounting bracket 140 will be off, the screw 165 may be removed and the wall mounting bracket 140 may be adjusted relative to the wall 110. It is noted that the small strips of closed-cell, neoprene gasket material 162 shown in FIG. 1A are used when the screw 165 is the exclusive means for attaching the wall mounting bracket 140 to the wall 110.

In FIG. 1A and FIG. 4, the wall mounting bracket 140 is secured directly to the exterior surface 112 of the wall 110 using the fastener 165 However, in some situations the installation company may choose to use bracket assemblies that extend away from the exterior surface 112 of the wall 110. FIG. 1B offers a side, cross-sectional view of a wall panel attachment system 100B, in an alternative embodiment. In the system 100B, the wall mounting bracket 140 and the panel bracket 150 are again used to secure a rigid architectural panel 130 to the wall 110. However, in this embodiment the wall mounting bracket 140 is secured to the wall 110 by means of a bracket assembly 120.

Each bracket assembly 120 is configured to be fastened to the exterior wall 110. In one aspect, each bracket assembly 120 comprises two back-to-back L-angle brackets 122', 122" fastened to each other via screws 124 to form a generally Z shaped assembly. A first bracket 122' is for attachment to the exterior wall surface 112, while a second bracket 122" is for fastening to the wall mounting bracket 140.

Each bracket assembly 120 is secured to the wall 110 by separate fasteners 126. The bracket assemblies 120 are preferably pre-fabricated. A first L-angle bracket is connected to the wall or substrate 110 and the second L-angle is set to the appropriate spatial position across the wall 110. Preferably, the bracket assemblies 120 is fabricated from steel for strength.

A plurality of bracket assemblies 120 are secured to the wall 110 in sequence. An installation company may then quickly attach wall mounting brackets 140 to the respective bracket assemblies 120 using the fastener 165. The installation company then hangs individual panels 130 onto the wall 110 by placing the panel brackets 150 onto respective wall mounting brackets 140.

Figure 6:
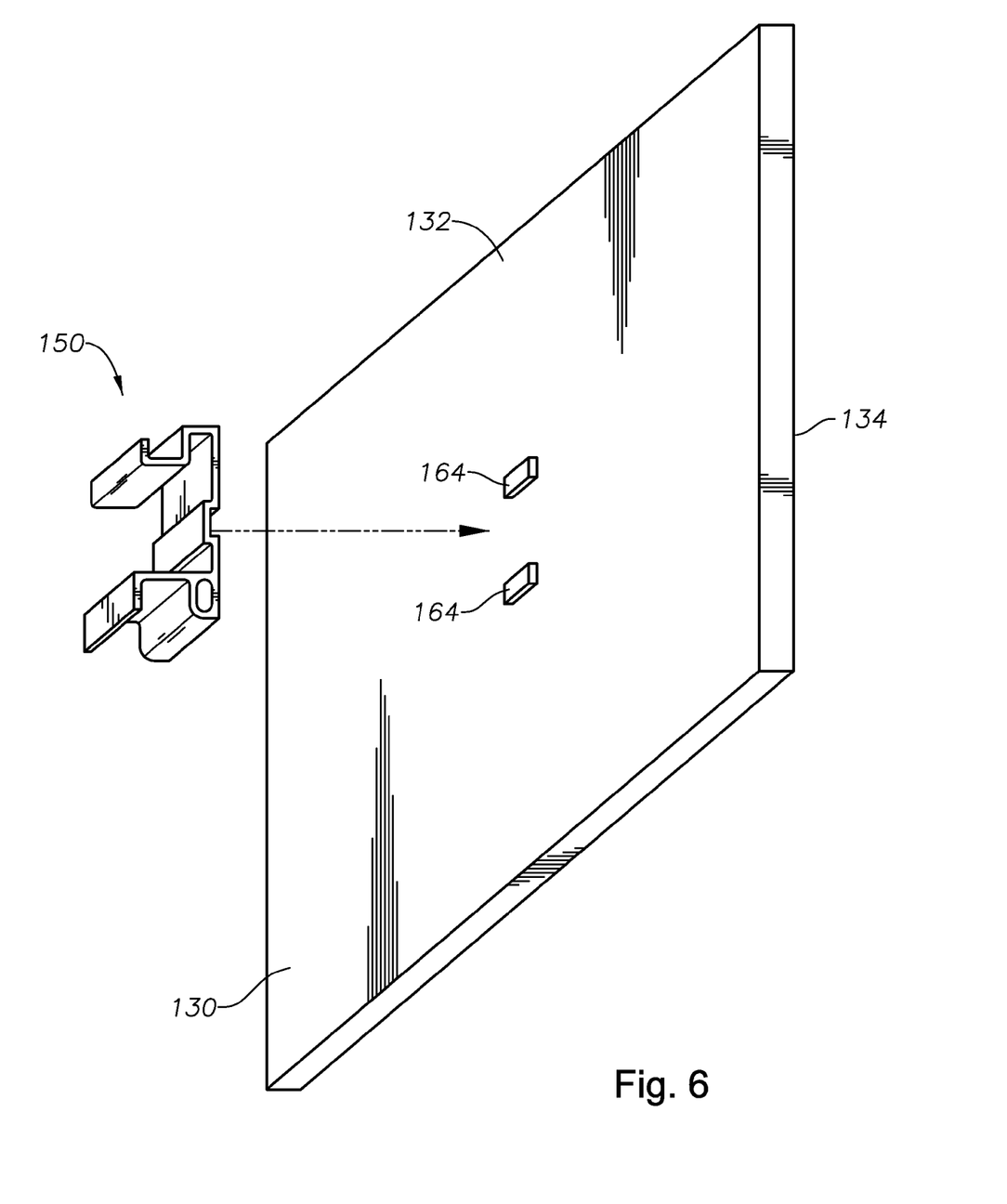
FIG. 6 is a perspective view of the panel bracket of FIG. 2. The panel bracket is shown exploded away from a panel. Strips of two-sided bonding tape are shown attached to a rear surface of the panel for connecting the panel bracket to the panel.

To demonstrate the connection of the panel bracket 150 to the panel 130, FIG. 6 is provided. FIG. 6 is a perspective view of the panel bracket 150 of FIGS. 2 and 3. The panel bracket 150 is shown exploded away from a rear surface 132 of the panel 130.

In FIG. 6, a threaded fastener is not shown; rather, the panel bracket 150 connects immediately to the rear surface 132 by means of adhesive material 164. The adhesive material 164 is in the form of bonding tape or, optionally, a structural silicone adhesive, or both.

Using the wall mounting brackets 140 and panel brackets 150, a plurality of wall panels 130 may be hung onto a building. FIG. 7 provides a perspective cut-away view of sub-framing used for mounting a plurality of rigid architectural panels 130 in the present system, in one arrangement.

The sub-framing is in the form of bracket assemblies 120. The bracket assemblies 120 represent horizontal rails secured to a wall 110, which support individual wall mounting brackets 140.

The bracket assemblies 120 are preferably installed horizontally at each horizontal joint. The bracket assemblies 120 may be in the form of two L-brackets secured together by screws (not shown). The L-brackets may be two back-to-back galvanized steel "L" angles as shown at 122', 122" in FIG. 1B. The L-angle brackets allow the installer to level the sub-framing in all three axes before installation of panels 130. Preferably, stainless steel screws are used to connect the L-brackets to the building wall 110. Further, the L-brackets themselves may be connected to each other through one or more stainless steel screws (not shown).

In the arrangement of FIG. 7, a separate wall mounting bracket 140 is provided for each panel 130. The wall brackets 140 are fastened to the bracket assemblies 120 by means of screws (such as fastener 165 shown in FIG. 1B). Each wall bracket 140 receives a panel bracket 150. The panel brackets are not seen in FIG. 7, as it is understood that the panel brackets reside behind the panels 130 and are hidden.

In FIG. 7, the panels 130 are shown as having square profiles. However, it is understood that the panels 130 may have other polygonal or even non-polygonal shapes. In one arrangement, the panels 130 define non-uniform, interlocking pieces such as one would see with puzzle pieces. In another arrangement, the panels 130 are a collection of rectangles, triangles, pentagons, or combinations thereof. The only thing required is that the installer secure the panel brackets 150 to the rear surfaces of the panels in such a manner that when hung on the wall mounting brackets 140, the panels are spaced and positioned properly on the wall 110.

Preferably, panel assemblies 130 are mounted from the bottom of the exterior building surface 110, and move up. In this way, the installer may make sure that each row is level relative to the previous row installed. However, it is observed here that the rigid panels may beneficially be installed in any direction or sequence.

This aspect of the inventions deserves further discussion. As can be seen in FIG. 7, the bracket assemblies 120 have been placed along the exterior building surface 110 in horizontal rows. The panels 130 may then be secured to the L-angle brackets of the bracket assemblies 120 (using the wall mounting brackets 140) from left-to-right, from right-to-left, or even out of order provided the correct spacing is maintained. Similarly, the bracket assemblies 120 may be placed along the exterior building surface 110 in vertical rows. The panels 130 may then be secured to the bracket assemblies 120 from bottom-to-top, from top-to-bottom, or out of order provided the correct spacing is maintained.

It is understood that where panels 130 are placed along a corner or edge of a wall 110, or adjacent a window sill or door frame, some modification of the dimensions of the edge panels is necessary.

In one embodiment, it is desirable to integrate the wall panel attachment system 100 with the ability to generate clean energy for the building on which the wall panels 130 are mounted. In this instance, the panels as shown in FIG. 7 may represent solar panels. The solar panels will have a plurality of photovoltaic (PV) cells (not shown) that convert solar energy into electrical energy. An electrical wire or cord will then carry electric current from the respective panels to the building's electrical power system.

When the panels 130 include PV panels, a high-density closed-cell foam tape (not shown) is preferably applied to the rear planar surface 132 of the panels 130. A bead or volume of structural silicone adhesive is then applied adjacent to the tape as the adhesive material 164. The high-density, closed-cell foam tape confines the structural silicone adhesive 164, and also maintains a gap between the panel bracket 150 and the panel 130 to ensure that that the electrically active area on the PV wall panel remains substantially unaffected.

The PV wall panels may be any desired PV panel that is suitable for use in the desired application. One example of such a PV panel is the ASI OPAK solar panel manufactured by Schott North America, Inc., of Elmsford, N.Y. It is noted that such solar panels can be very heavy—even up to 60 pounds, depending on dimensions. Therefore, care should be taken to ensure that a quality adhesive is used for securing the panels to the panel brackets 150.

In one aspect, the installer may choose to install a combination of PV and non-PV wall panels to the exterior wall of a building. In this instance, it is desirable that the exterior surfaces of the solar panels are flush with the adjacent non-solar wall panels. To accomplish this, the depth of the wall mounting brackets 140 and the corresponding panel brackets 150 should be increased where the non-PV wall panels are being hung. This may be done, for example, by using brackets 140, 150 that have a greater depth. Regardless of the size of the brackets 140, 150 and regardless of the configuration of the panels 130, the panels may be hung in any sequence or direction.

A method 800 for attaching architectural wall panels to an exterior building wall is also provided herein. The method 800 uses a plurality of rigid wall panels, such as ceramic tiles.

Figure 8:
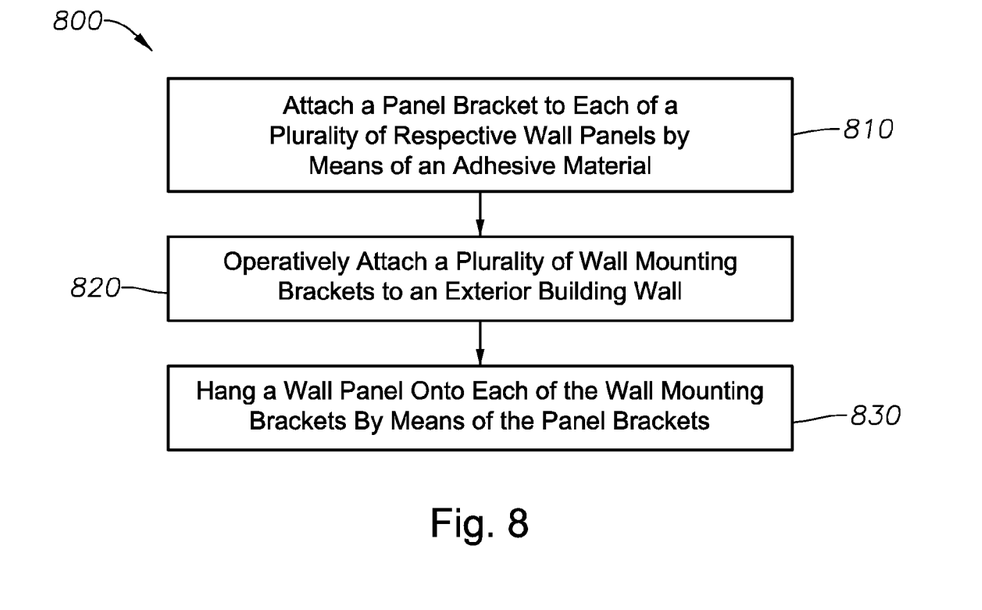
FIG. 8 is a flow chart showing steps for performing a method for attaching architectural wall panels to an exterior building wall, in one embodiment.

FIG. 8 is a flow chart showing steps for performing the method 800 for attaching architectural wall panels to an exterior building wall, in one embodiment. The method 800 includes attaching a plurality of wall mounting brackets to the exterior building wall. This is shown in Box 820. Each of the wall mounting brackets is configured as described above for bracket 140. The wall mounting brackets are spaced to accommodate the position of a corresponding wall panel.

The method 800 also includes hanging a wall panel onto each of the wall mounting brackets. This is indicated in Box 830. Each wall panel has an attached panel bracket, with the panel brackets being configured as described above for bracket 150. Each of the wall mounting brackets and the nested panel brackets is substantially similar, if not identical, in dimension and configuration. The nesting takes place by turning the panel brackets upside-down.

The panel brackets may be pre-attached to the panels. Optionally, however, the method 800 includes attaching a panel bracket to a respective wall panel by means of the adhesive. This is seen at Box 810. The adhesive is one or more strips of bonding tape, structural silicone adhesive, or combinations thereof. Once the panel brackets are secured to the backs of the panels, the panels may be quickly hung without need of further mechanical fastening.

As part the step of Box 810, the installer must identify the position along the rear surface of the panel for affixing the panel bracket. Where the panels are uniform in size, the position will be the same for each panel. However, where panels of different sizes or profiles are used, some thought must be given in advance as to where the panel brackets are to be affixed.

The system is configured to allow wall panels to be attached to the wall in any sequence or direction. The wall panels may be attached directly to the wall using the wall mounting brackets 140 and the panel brackets 150; alternatively, bracket assemblies 120 may be used between the wall and the wall mounting brackets 140 as shown in FIG. 1B.

Figure 9:
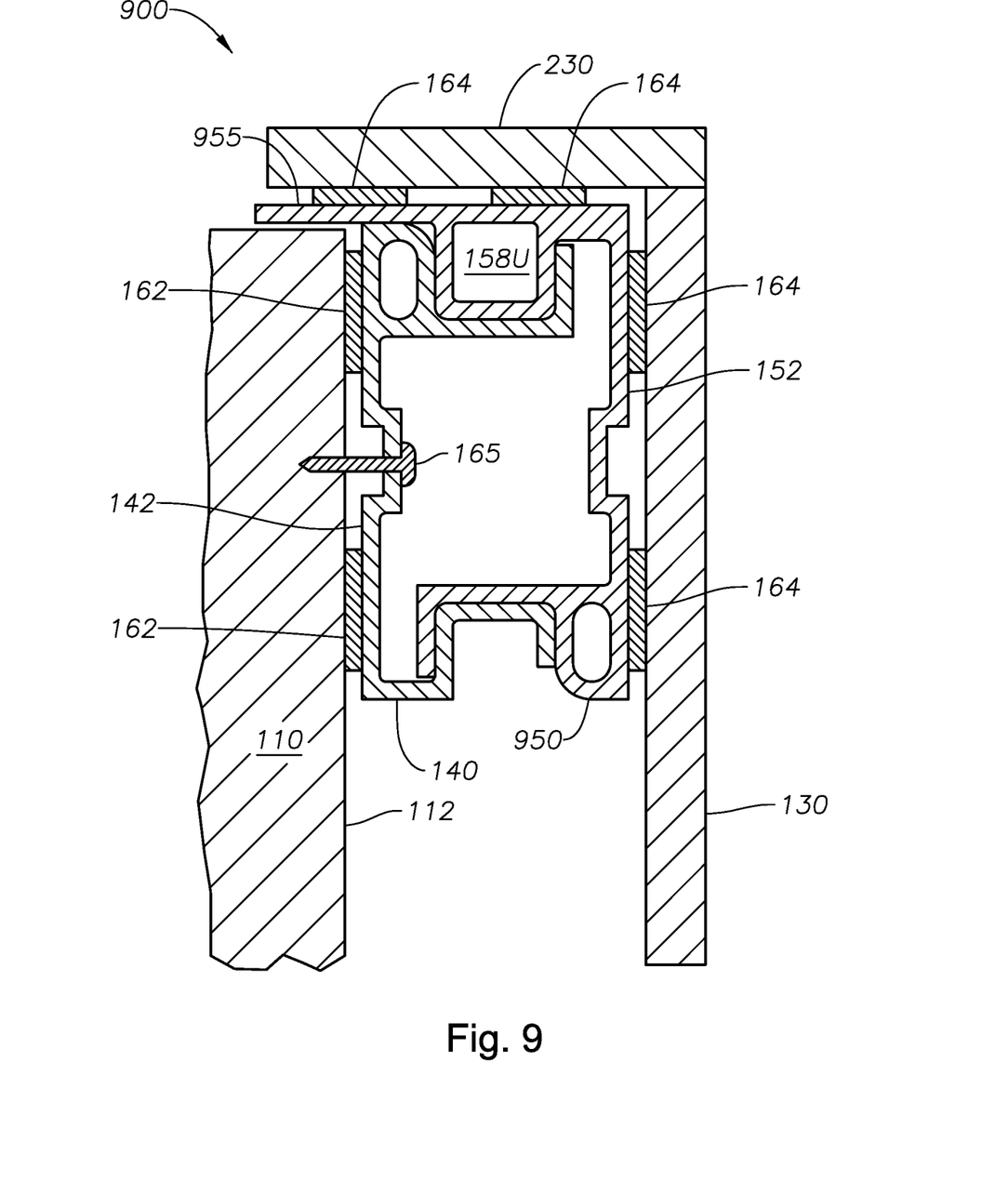
FIG. 9 is a side, cross-sectional view of a wall panel attachment system, in an alternative embodiment. Two rigid architectural wall panels are shown connected to a modified panel bracket.

It is noted that the system 100A may be used at corner locations of a building. FIG. 9 is a side, cross-sectional view of a wall panel attachment system 900, in an alternative embodiment. Here, two rigid architectural wall panels 130, 230 are shown connected to a panel bracket 950 in perpendicular arrangement. To provide for this connection, the panel bracket 950 is modified. In this respect, the panel bracket 950 includes a planar wing 955 that extends across the upper channel 158U of the panel bracket 950.

The foregoing description illustrates only certain embodiments of the invention. Persons skilled in the art will appreciate and understand that modifications and variations are, or will be, possible to utilize and carry out the teachings of the invention described herein. Accordingly, all suitable modifications, variations and equivalents may be resorted to, and such modifications, variations and equivalents are intended to fall within the scope of the invention as described and within the scope of the claims.

What is claimed is:

1. A system for attaching architectural wall panels to an exterior building wall, each wall panel having a dead load, and the system comprising:
   a plurality of rigid wall panels;
   a plurality of wall mounting brackets configured to carry the dead loads of the respective wall panels, each wall mounting bracket having:
      an exterior surface configured to reside adjacent to the building wall,
      a central fastening surface along the exterior surface,
      an upper channel above the central fastening surface extending opposite the exterior surface, and
      a lower channel below the central fastening surface facing opposite the upper channel, and also extending opposite the exterior surface;
   a plurality of panel brackets, each panel bracket comprising:
      an exterior surface configured to reside along a rear surface of a respective wall panel,
      an adhesive along the exterior surface for connecting the panel bracket to a respective wall panel, and gravitationally supporting the wall panel,
      an upper channel extending opposite the exterior surface of the panel bracket and configured to nest on and to be gravitationally supported by the upper channel of a respective wall mounting bracket, and
      a lower channel also extending opposite the exterior surface of the panel bracket, and configured to nest on and be gravitationally supported by the lower channel of the respective wall mounting bracket; and
   a plurality of bracket assemblies fastened to the exterior wall as sub-structure;
   wherein:
   each of the wall mounting brackets is substantially identical in profile to a corresponding panel bracket; and
   the central fastening surface of each wall mounting bracket is connected to a bracket assembly by means of a mechanical fastener at the central fastening surface, thereby allowing panel brackets and connected wall panels to be hung onto and supported by the wall mounting brackets.

2. The system of claim 1, wherein each of the wall mounting brackets and its corresponding panel bracket is substantially similar in dimension.

3. The system of claim 1, wherein each wall panel comprises a plurality of photovoltaic cells for converting solar energy to electrical energy, and an electrical cable for delivering electrical current from the plurality of photovoltaic cells.

4. The system of claim 1, wherein each wall panel is fabricated from a ceramic material.

5. The system of claim 4, wherein:
   each wall panel further comprises a substantially planar rear surface; and
   each wall panel is fabricated from a porcelain material to form a porcelain ceramic tile.

6. The system of claim 2, wherein
the system is configured to allow panel brackets and connected wall panels to be hung onto the wall mounting brackets in any horizontal or vertical order.

7. The system of claim 2, wherein:
   each bracket assembly comprises two back-to-back L-angle brackets fastened to each other to form a generally Z-shaped assembly, a first end of which is for attachment to the wall and a second end of which is for fastening to a wall mounting bracket by means of the mechanical fastener.

8. The system of claim 7, wherein:
   each wall mounting bracket and each panel bracket comprises aluminum; and
   each bracket assembly comprises steel.

9. The system of claim 1, wherein the adhesive is one or more strips of bonding tape, structural silicone adhesive, or combinations thereof.

10. The system of claim 1, further comprising:
    at least two pieces of foam placed along the exterior surface of the wall mounting bracket, with a first piece of foam being placed above the central fastening surface, and a second piece of foam being placed below the central fastening surface.

11. The system of claim 1, further comprising:
    at least two pieces of two-sided adhesive tape placed along the exterior surface of the wall mounting bracket, with one piece being placed above the central fastening surface, and the other being placed below the central fastening surface.

12. The system of claim 1, further comprising:
    mechanical fasteners for fastening respective wall mounting brackets directly to a wall.

13. A system for attaching ceramic wall panels to an exterior building wall, each wall panel having a dead load, and the system comprising:
    a plurality of bracket assemblies having a first end and a second end, with each bracket assembly being fastened at its first end to the exterior wall, and each bracket assembly comprising two back-to-back L-angle brackets fastened to each other to form a generally Z-shaped assembly, a first end of which is for attachment to the exterior wall;
    a plurality of rigid wall panels;
    a plurality of wall mounting brackets configured to carry the dead loads of the respective wall panels, each wall mounting bracket having:
       an exterior surface configured to reside adjacent to the building wall,
       a central fastening surface along the exterior surface, and connected to a bracket assembly at its second end;
       an upper channel above the central fastening surface extending opposite the exterior surface, and
       a lower channel below the central fastening surface and also extending opposite the exterior surface;
    a plurality of panel brackets, each panel bracket comprising:
       an exterior surface configured to reside along a rear surface of a respective wall panel,
       an adhesive material along the rear surface of each of the panels connecting each of the panel brackets to a respective panel, and gravitationally supporting the panel;
       an upper channel extending opposite the exterior surface of the panel bracket and configured to nest on and to be gravitationally supported by the upper channel of a respective wall mounting bracket, and a lower channel also extending opposite the exterior surface of the panel bracket and configured to nest on and to be gravitationally supported by the lower channel of the respective wall mounting bracket; and wherein:

the system is configured to allow panel brackets and attached wall panels to be hung on the wall mounting brackets in any vertical or horizontal sequence, and each of the wall mounting brackets and the panel brackets is identical in profile.

14. The attachment system of claim 13, wherein each of the wall mounting brackets and corresponding panel brackets is identical in dimension.

15. The attachment system of claim 13, wherein the adhesive material comprises one or more strips of bonding tape, structural silicone adhesive, or combinations thereof.

16. A method for attaching architectural wall panels to an exterior building wall, comprising:

securing a plurality of bracket assemblies to a wall, as sub-structure, with each bracket assembly being fastened at a first end to the exterior wall;

providing a plurality of rigid wall panels;

attaching each of a plurality of wall mounting brackets to a second end of a bracket assembly, each of the wall mounting brackets being spaced to accommodate the position of a corresponding wall panel, and each of the wall mounting brackets having:

an exterior surface configured to reside adjacent to the building wall, a central fastening surface along the exterior surface;

an upper channel above the central fastening surface extending opposite the exterior surface, and a lower channel below the central fastening surface and also extending opposite the exterior surface;

hanging a wall panel onto each of the wall mounting brackets, wherein each wall panel has an attached panel bracket, with each panel bracket comprising:

an exterior surface configured to reside along a rear surface of a respective wall panel, an adhesive along the exterior surface connecting the panel bracket to a respective panel, and gravitationally supporting the panel, an upper channel nesting on and gravitationally supported by the upper channel of a respective wall mounting bracket, and a lower channel nesting over and gravitationally supported by the lower channel of the respective wall mounting bracket;

wherein:

each of the wall mounting brackets and the respective panel brackets is substantially similar in profile.

17. The method of claim 16, wherein:

each of the wall mounting brackets and the panel brackets is identical in dimension; and the panel brackets and connected wall panels are configured to be hung on the wall mounting brackets along the wall in any vertical or horizontal order.

18. The method of claim 16, wherein the adhesive is one or more strips of bonding tape, structural silicone adhesive, or combinations thereof.

19. The method of claim 18, further comprising:

attaching a panel bracket to each of the respective wall panels by means of the adhesive.

20. The method of claim 19, further comprising:

identifying where on the rear surface of each panel the panel bracket is to be affixed.

21. The method of claim 18, wherein each panel bracket is pre-adhered to a wall panel before installation to the building wall.

22. The method of claim 16, wherein each bracket assembly comprises two back-to-back L-angle brackets fastened to each other to form a generally Z-shaped assembly, a first end of which is for attachment to the wall.

23. A system for attaching architectural wall panels to an exterior building wall, each wall panel having a dead load, and the system comprising:

a plurality of rigid wall panels;

a plurality of wall mounting brackets configured to carry the dead loads of the respective wall panels, each wall mounting bracket having:

an exterior surface configured to reside adjacent to the building wall, a central fastening surface along the exterior surface, an upper channel above the central fastening surface extending opposite the exterior surface, and a lower channel below the central fastening surface facing opposite the upper channel, and also extending opposite the exterior surface;

a plurality of panel brackets, each panel bracket comprising:

an exterior surface configured to reside along a rear surface of a respective wall panel, an adhesive along the exterior surface for connecting the panel bracket to a respective panel, and gravitationally supporting the panel, an upper channel extending opposite the exterior surface of the panel bracket and configured to nest within and to be gravitationally supported by the upper channel of a respective wall mounting bracket, and a lower channel also extending opposite the exterior surface of the panel bracket, and configured to nest over and to be gravitationally supported by the lower channel of the respective wall mounting bracket;

a plurality of bracket assemblies fastened to the exterior wall, each bracket assembly comprising two back-to-back L-angle brackets fastened to each other to form a generally Z-shaped assembly, a first end of which is for attachment to the wall and a second end of which is for fastening to a wall mounting bracket by means of the mechanical fastener; and wherein each of the wall mounting brackets is identical in profile and substantially similar in dimension to a corresponding panel bracket.

24. The method of claim 22, wherein each bracket assembly comprises two back-to-back L-angle brackets fastened to each other to form a generally Z-shaped assembly, a first end of which is for attachment to the wall and a second end of which is for fastening to a wall mounting bracket by means of a mechanical fastener.

* * * * *